US008869098B2

(12) United States Patent
Elaasar et al.

(10) Patent No.: US 8,869,098 B2
(45) Date of Patent: Oct. 21, 2014

(54) COMPUTER METHOD AND APPARATUS FOR PROVIDING MODEL TO MODEL TRANSFORMATION USING AN MDA APPROACH

(75) Inventors: Maged E. Elaasar, Kanata (CA); Jeffrey M. Fischer, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 1519 days.

(21) Appl. No.: 11/950,926

(22) Filed: Dec. 5, 2007

(65) Prior Publication Data

US 2009/0150854 A1    Jun. 11, 2009

(51) Int. Cl.
*G06F 9/44*    (2006.01)

(52) U.S. Cl.
CPC ........................................ *G06F 8/10* (2013.01)
USPC ............................ 717/104; 717/106; 717/136

(58) Field of Classification Search
None
See application file for complete search history.

(56) References Cited

U.S. PATENT DOCUMENTS

| | | | | |
|---|---|---|---|---|
| 5,315,709 | A * | 5/1994 | Alston et al. ........................... | 1/1 |
| 5,596,746 | A * | 1/1997 | Shen et al. ............................. | 1/1 |
| 6,901,588 | B1 * | 5/2005 | Krapf et al. ..................... | 717/164 |
| 7,185,016 | B1 * | 2/2007 | Rasmussen ........................... | 1/1 |
| 7,454,764 | B2 * | 11/2008 | Goyal et al. .................... | 719/330 |
| 7,693,586 | B2 * | 4/2010 | Dumas et al. .................... | 700/32 |
| 7,761,844 | B2 * | 7/2010 | Bove et al. ..................... | 717/106 |
| 7,769,769 | B2 * | 8/2010 | Rasmussen ..................... | 707/756 |
| 7,941,461 | B2 * | 5/2011 | Chang et al. .................. | 707/803 |
| 7,949,941 | B2 * | 5/2011 | Liu et al. ....................... | 715/234 |
| 2004/0015834 | A1 * | 1/2004 | Mestre et al. .................. | 717/106 |
| 2005/0071805 | A1 * | 3/2005 | Lauterbach et al. .......... | 717/104 |
| 2006/0064667 | A1 * | 3/2006 | Freitas .......................... | 717/104 |
| 2007/0179821 | A1 * | 8/2007 | Poetsch et al. ..................... | 705/7 |
| 2008/0126027 | A1 * | 5/2008 | Altenhofen et al. .............. | 703/2 |

OTHER PUBLICATIONS

Chen et al., "A Model Drive XML Transformation Framework for Business Performance Management", 2005, Proceedings of the IEEE International Conference on e-Business Engineering.*

(Continued)

*Primary Examiner* — Lewis A Bullock, Jr.
*Assistant Examiner* — Christine Dang
(74) *Attorney, Agent, or Firm* — Holland & Knight LLP; Brian J. Colandreo, Esq.; Jeffrey T. Placker, Esq.

(57) ABSTRACT

A Model Transformation Authoring Framework (MTAF) method and apparatus for authoring and providing model-to-model transformations from one domain to another domain is disclosed. Given a domain and a target domain, at least the given domain having a respective structured hierarchy, the invention system enables a user to specify a declarative mapping (transformation declarative) between a domain specific language modeling the given domain and a modeling language modeling the target domain. The declarative mapping models how the domain specific language modeling the given domain relates to the modeling language of the target domain. The system generates a transformation code implementation of a transformation from the given domain to the target domain. The MTAF provides to the user design decisions with respect to Specification, Transformation Rules, Rule Organization, Rule Application Control, Source-Target Relationship, Incrementality, and Directionality and Tracing. The generated transformation code is executed at runtime to perform the transformation of the domain specific language of the given domain to the modeling language of the target domain. Instances of models of the target domain resulting from the performed transformation at runtime may be output to other model transformations, to JET templates, or may be persisted, merged or chained among other post processing.

18 Claims, 11 Drawing Sheets

(56) References Cited

OTHER PUBLICATIONS

Mili et al, "Going beyond MDA: Business Process Modeling for Software Reuse," 2004.*

Czarnecki, K., et al., "Feature-Based Survey of Model Transformation Approaches," *IBM Systems Journal*, vol. 45(3): pp. 612-646, (2006).

IBM Rational Software Architect Version 7.0. http://www-1.ibm.com/support/docview.wss?rs=2044&uid=swg24013690, Release Date (Dec. 5, 2006).

Swithinbank, M., et al., "Patterns: Model-Driven Development Using IBM Rational Software Architect (Section 9.5.2)", *IBM Redbooks*. http://www.redbooks.ibm.com/redbooks/pdfs/sg247105.pdf, Dec. 2005.

* cited by examiner

```
/** @generated*/
public class PropertyToAttributeTransform extends MapTransform {
    /** @generated*/
    protected void addGeneratedTransformElements (Registry registry) {
        add (getNameToName_Rule());
        add (getToKind_Rule());
        add (getTypeToType_Rule());
    }
    /** @generated*/
    protected AbstractRule getNameToName_Rule() {
        return new MoveRule (
            UMLPackage.Literals.NAMED_ELEMENT_NAME,
            BeanCodegenModelPackage.Literals.ATTRIBUTE_NAME);
    }
    /** @generated*/
    protected AbstractRule getTypeToType_Rule() {
        CustomRule rule = new CustomRule (
            new RuleExtention () {
                public void execute (EObject source, EObject target) {
                    executeTypeToType_Rule ((Property) source, (Attribute) target);
                }
            });
        return rule;
    }
    /** @generated*/
    protected void executeTypeToType_Rule (Property Property_src, Attribute Attribute_tgt) {
        Attribute_tgt.setType (Property_src.getType ().getName ());
    }
}
```

Project tree:
- com.xyz.uml2bean
  - src
    - com.xyz.uml2bean
    - com.xyz.uml2bean.l10n
    - com.xyz.uml2bean.transforms
      - Class2BeanTransform.java
      - MainTransform.java
      - ModelToRootTransform.java
      - PackageToPackageTransform.java
      - PackageToProjectTransform.java
      - PropertyToAttributeTransform.java
  - model
    - UML2Bean.mapping

29

ATTRIBUTE_NAME);

FIG. 11

COMPUTER METHOD AND APPARATUS FOR PROVIDING MODEL TO MODEL TRANSFORMATION USING AN MDA APPROACH

BACKGROUND OF THE INVENTION

Model-driven architecture (MDA) can dramatically increase the efficiency of software projects and the quality of produced software. Model transformation technologies play a key role in MDA automation. Technologies that help transform a model from one language to another, or from one level of abstraction to the next, are in demand by any organization looking to adopt MDA. This application of model transformations is referred to as forward engineering. Other applications that are not discussed here include reverse engineering of high level models from lower level models, creating query-based views of a system and performing model refactoring.

Unfortunately, model-to-model transformations are inherently complex to author. The complexity derives from two sources: obviously the transformation problem domain but also the transformation solution domain. The larger and more complicated the modeling languages, the more effort it takes to author their transformations. However, the technology used in realizing a transformation can also have a profound effect on the authoring effort in terms of time and resources required.

There has been a tremendous interest in model-to-model transformation technologies over the past few years; in particular since the OMG (Object Management Group) announced its call for standardization that has resulted in the adoption of the Query-View-Transform (QVT) specifications. Since then, a large number of approaches have been proposed and several were either prototyped or commercialized. However, there has not been much experience with applying most of those approaches in practice. A good categorization of those approaches, outlined in this section, is given in more details in K. Czarnecki and S. Helsen., "Feature-based Survey of Model Transformation Approaches", *IBM Systems Journal*, vol. 45, number 3, pages 612-646 (2006). Other surveys are given in T. Gardner, C. Griffin, J. Koehler, and R. Hauser, "A Review of OMG MOF 2.0 Query/Views/Transformations Submissions and Recommendations toward the Final Standard," OMG Document ad/03-08-02; and S. Sendall and W. Kozaczynski, "Model Transformation: The Heart and Soul of Model-Driven Software Development," *IEEE Software* 20, No. 5, pages 42-45, (2003).

One category of approaches to model transformations encompasses pure imperative ones, where an object-oriented framework in some programming language (e.g. Java) offers basic infrastructure to help organize the transformation. That infrastructure consists mainly of APIs and a design pattern with several abstract classes to be implemented by concrete extenders. However, those extenders are left to implement some major strategies like traceability and application control on their own. An example of such an approach is the Transformation Service framework provided in the RSx family of modeling products (P. Swithinbank, M. Chessell, T. Gardner, C. Griffin, J. Man, H. Wylie and L. Yusuf, "Patterns: Model-Driven Development Using IBM Rational Software Architect," (Section 9.5.2). *IBM Redbooks* at www.redbooks.ibm.com/redbooks/pdfs/sg247105.pdf). The transformation imperative logic in RSx is done using the Java Metadata Interface (JMI) generated by the EMF framework for domain-specific languages (DSL).

Another category of imperative approach uses higher level dedicated model manipulating languages (e.g. an imperative extension of OCL—Object Constraint Language). A typical approach in this category allows a mapping rule to be specified as an operation on a model element. An operation declares its input type and output type and then the body has imperative logic that populates the attributes of the output type. An example of an approach in this category is the QVT Operational language.

A different category of approaches have the transformation specifications guided with the structure of the target DSL (Domain Specific Language). Approaches in this category have two phases: one for creating the structure (containment hierarchy) of the target model and another for initializing the attributes and connecting the cross-references. Transform authors do not need to explicitly specify scheduling or application strategies as they can automatically be inferred. One approach in this category is the OMG Interactive Objects and Project Technology, which structures the transformation rules into a containment hierarchy based on the one implied by the target domain. There is one rule for every target element type and the application strategy creates the target model top down by traversing down the rule hierarchy. Another example is OptimalJ by Compuware, where transformations are structured using source-to-target copy methods whose parameters' types determine the input domains and whose return type determines the output domain. The framework is able to determine, based on method signatures, the complete application strategy.

Another interesting category is template-based. Approaches in this category specify model transformations using output model templates with variable sections that contain logic to derive their values from input models. A common way to define those variable sections is through annotations expressed using the syntax of the target modeling language. For example, the Ecore language allows for annotating models with user-defined annotations. The derivation logic within annotations can be expressed in any query-based language like OCL. An example of approaches in this category is given in K. Czarnecki and M. Antkiewicz, "Mapping Features to Models: A Template Approach Based on Superimposed Variants," *Proc. of the 4th International Conference on Generative Programming and Component Engineering*, Tallinn, Estonia (2005), pp. 422-437, where a UML (Unified Modeling Language) model can be templatized with specific stereotypes applied to UML elements. These stereotypes contain conditions, iterations and other expressions used when instantiating the template.

Furthermore, relational approaches represent another category, where the transformation logic is expressed declaratively using mathematical relationships. The main idea is to declaratively specify mappings between input and output domains using constraints expressed in some sort of mathematical logic. An inference engine is then provided to determine a strategy for applying these rules through a process of constraint solving. In contrast to imperative approaches, relational approaches are side-effect free and can usually support reversible transformations. Examples in this category include MTF (C. Griffin, "IBM Model Transformation Framework 1.0.0: Programmer's Guide, 2004," at www.alphaworks.ibm.com/tech/mtf) and QVT Relations published by the OMG.

Another main category of transformations use graph rewriting rules in their specifications. Structured models are treated as typed, attributed and labeled graphs of elements. Transformation rules in this category have two sides: a left hand side (LHS) that expresses a pattern to be matched on the input model, and a right hand side (RHS) with another pattern to replace that of the LHS. Patterns of both sides are usually specified in the concrete syntax of the modeling languages at each side; an advantage to authors, who are usually familiar with those languages and not their abstract syntax (something often required in other approaches). Examples of approaches in this category include Fujaba by University of Paderborn Software Engineering and Attributed Graph Grammer.

Hybrid approaches also exist. Those are approaches where multiple strategies are used. For example QVT has three different languages: Relational, Operational and Core. Another approach is ATL (see F. Jouault and I. Kurtev, "Transforming Models with ATL," *Proc. of Model Transformations in Practice Workshop (MTIP)*, MoDELS, Montego Bay, Jamaica 2005), where rules can be fully declarative, fully imperative or a hybrid.

SUMMARY OF THE INVENTION

The present invention addresses the problems and disadvantages of prior art. In particular, the present invention provides a new MDA approach to authoring model-to-model transformations that addresses the requirements of simplicity of specification, ease of adoption, extensibility and ease of integration with existing tools. The invention approach is implemented in a framework called the Model Transformation Authoring Framework (MTAF). A unique feature of the framework is that it applies, itself, the MDA principle of starting with a PIM (platform independent model) then transforming it to a PSM (platform specific model). In this case, the PIM is an instance of a dedicated MOF-based (Meta Object Facility) DSL for specifying declarative mappings between other MOF-based modeling languages. The PSM is a best-practice imperative transformation implementation that is expressed using a well-established object-oriented transformation framework, which has been commercialized within IBM's Rational Software Architect (RSA) tool. MTAF is able to transform the declarative PIM to the imperative PSM using code generation.

MTAF's adoption of MDA allows its transformations to enjoy the advantages of two worlds: a high level declarative mapping language that is simple to specify and has a visual notation and a lower level imperative implementation that uses a proven extensible design pattern in a popular object-oriented programming language. MTAF also has a standard implementation that is available in the new RSA Version 7.0 tool. The implementation leverages open standards and open source technologies that are used by an increasing number of tool vendors, facilitating its adoption.

In addition, MTAF provides transform authors with pre-packaged solutions for recurring transformation design problems. These problems include traceability between source and target elements, incremental updating of target model, and the ability to mix imperative with declarative transformation logic. Having efficient and transparent solutions to those problems greatly simplifies the solution domain for transformation authors and allows them to concentrate on their problem domain.

In a preferred embodiment, a computer method and system for generating model-to-model transformations from one domain having a respective structured hierarchy to a second domain, comprises the steps of:

having a given domain and a target domain, at least the given domain having a respective structured hierarchy, enabling a user to model and specify a transformation declarative;

in response to the user specified transformation declarative, creating a declarative mapping between a domain specific language modeling the given domain and a modeling language modeling the target domain, the declarative mapping specifying how the domain specific language modeling the given domain relates to the modeling language of the target domain;

using the declarative mapping, generating a transformation code implementation of transformation from the given domain to the target domain, the generated transformation code being executable to perform a transformation of the domain specific language of the given domain to the modeling language of the target domain; and outputting instances of models of the target domain resulting from the performed transformation at runtime.

The MTAF provides to the user design decisions with respect to any one or combination of Specification, Transformation Rules, Rule Organization, Rule Application Control, Source-Target Relationship, Incrementality, and Directionality and Tracing.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 11 is an example of generated transformation and corresponding sample transformation code.

DETAILED DESCRIPTION OF THE INVENTION

A description of example embodiments of the invention follows.

Figure 1:
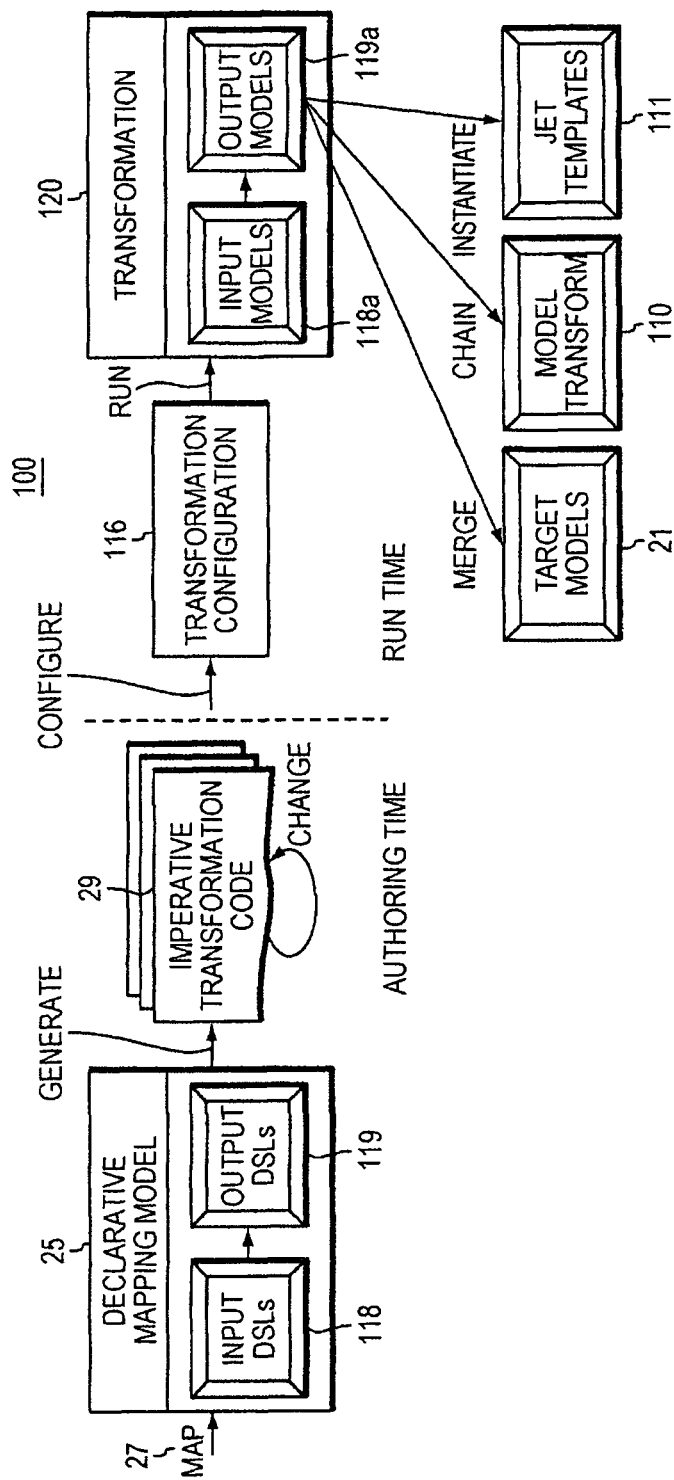
FIG. 1 is a block diagram of one embodiment of the present invention.

Applicants have discovered that the MTAF framework provides the ability to author transformations between input and output Ecore-based DSLs. Further details on Ecore-based DSLs are in F. Budinsky, D. Steinberg, T. Grose, S. Brodsky and E. Merks, "Eclipse Modeling Framework," Pearson Education, August 2003 herein incorporated by reference. The process of authoring and running such a transformation using MTAF according to the present invention is shown in FIG. 1. The authoring process is illustrated on the left hand side of FIG. 1, and run time is shown to the right of dashed vertical line. The first step in the authoring process is to map the input domain meta model and the output domain meta model DSLs 118, 119 using a declarative mapping DSL 27 provided by MTAF. The mapping DSL 27 is a refinement to the one provided in IBM Rational Software Architect Version 7.0 and is detailed below. The result of the first step is a mapping model (transformation specification) 25 that specifies how the input domain DSLs 118 relate to the output domain DSLs 119. MTAF also extends a mapping graphical editor to simplify the specification of the mapping model 25.

The second step in the authoring process is to generate an imperative transformation code implementation 29. MTAF provides a realization to the abstract transformation Java API provided by RSxTS (IBM Rational Software Transformation Services). The realization, detailed below, provides an imperative implementation to the declarative specification in mapping models 25. The mapping between the specification and the corresponding implementation is specified by MTAF using JET (Java Emitter Templates) templates. MTAF configures JET to use the JMerge strategy for code regeneration. This gives the ability to change the generated transformation or add to it without losing those changes on regeneration; a big advantage when that logic is not expressible in the declarative specification 25. Another advantage is the ability to debug the transformation using the implementation language debugger in addition to the high level trace functionality instrumented by RSxTS (IBM Rational Software Transformation Services).

Once the transformation code 29 is ready, it can be deployed at runtime illustrated on the right hand portion of FIG. 1. The first step of running a transformation is to configure 116 it with various options including the input models and the post processing actions. The input models 118a have to be instances of the input domain DSLs 118. The second step actually invokes the transformation 120 on the input models 118a to produce output models 119a that are instances of the output domain DSLs 119. MTAF generates new output models 119a every time a transformation 120 is run (a design choice further discussed later). The third step determines what to do with the output models 119a, which depends on the configured post processing actions at transformation configuration 116. One such action merges the output models 119a with user specified target models 21. MTAF implements a merge strategy using the compare and merge framework in K. Letkeman, "Comparing and Merging UML models in IBM Rational Software Architect—Part 1-6," at www-128.ibm.com/developerworks/rational/library/05/712_comp/, herein incorporated by reference. Another action is to chain the output models 119a as input models to another model-to-model transformation 110. The last action provides the output models 119a to JET templates 111 to use it as input to instantiate text templates.

All transformation approaches face design decisions and have to make choices. The MTAF framework is no different, as it makes some strategic design choices that are outlined next. The presentation of these choices is structured following a feature-model for transformation approaches that has been recently proposed by K. Czarnecki, et al., cited above. The feature model specifies several design decisions for a transformation approach. The choices made by MTAF are discussed below:

Specification. The MTAF framework supports a hybrid declarative and imperative specification style. The declarative specification style is provided through a mapping DSL that is used to specify mapping relationships between input and output domains. The resulting mapping model accepts as domains Ecore-based DSLs. The imperative specification style is provided by first generating an equivalent imperative implementation and second allowing the implementation to be augmented with additional imperative logic.

Transformation Rules. The declarative mapping rules provided by MTAF mainly have one input and one output domains. Although having more domains could make the mapping DSL 27 more expressive, this choice seems non-limiting in most cases. One exception to be noted here is a custom mapping rule, which is used to specify a user-defined imperative rule. This mapping is allowed to have any number input and output domains as the user is responsible for using them. There are three levels of nesting for mapping rules in MTAF specifying increasing levels of details. The top most level specifies mappings between the domain metamodels themselves, the second level specifies mappings between individual types in these metamodels and the third level specifies mappings between individual features in those types. MTAF also provides detailed semantics for every mapping including refinements like conditions, filters and user-defined code. The supported languages for query code are Java and Object Constraint Language (OCL), while the supported language for imperative code is only Java at this time.

Rule Organization. MTAF allows physical organization of mapping rules in one or more mapping models. MTAF also currently allows one sort of reuse mechanism among mapping rules, which is aggregation. A second-level mapping between some types is allowed to delegate to another second-level mapping to map some features of those types. Recursion can be implemented when a mapping delegates to itself.

Rule Application Control. MTAF employs a depth first application strategy for mapping rules that is deterministic, once a starting point has been determined. Two reasons exist for this deterministic behavior: 1) mappings are nested in ordered collections and 2) there is no current support for mapping inheritance. The starting point for the traversal strategy is determined based on the input model's root element. Second-level mappings are traversed in sequence and the first one that accepts the root element as input becomes the starting point. Once there, the strategy moves on to its nested mappings in sequence and follows references to other second-level mappings in a depth first fashion.

Source-Target Relationship. MTAF supports the specification of mapping rules between input and output DSLs, which might be the same. Moreover, MTF does not support the specification of graph rewriting rules that are often specified on one DSL. This means that every time an MTAF transformation is run on input models it produces new output models even though the DSLs for both sides are the same.

Incrementality. MTAF does not currently support source incrementality, which is the ability to minimize the amount of input model 118a to transform based on changes to that model. However, it supports target incrementality (or reapply), which is the ability to update target models 21 based on changes to source models. The framework supports this functionality when the merge action is configured as a post processing action for a given transformation 120. Using the compare and merge framework in K. Letkeman, mentioned above, the merge action is able to detect change deltas between models at both sides, although it is not able to recognize which side has caused the changes. The reason for that inability is the lack of mechanism for marking manual changes to the target models 21. The current support gives users a chance to review these deltas visually and decide for themselves whether to apply each of them or not.

Directionality. MTAF mapping rules are typically directional, specifying how their input domains map to their output domains usually with code refinements (e.g. conditions, filters, extractors . . . etc). However, simple rules that do not have code refinements are reversible. Therefore, mapping models that are made up only of simple mappings could possibly generate reversible transformations. The uncertainty is coming from the fact that different inputs may lead to the same output making the behavior non-deterministic in the reverse direction.

Tracing. The mapping DSL used by MTAF does not require the specification of traceability information between the input and output domain DSLs 118, 119. Traceability information is needed by other approaches (e.g. QVT and MTF) to properly update target models by matching existing target elements to source elements. MTAF uses a different strategy for tracing. The strategy is implemented as a matching strategy that is configured in the merge post processing action and used by compare and merge framework above. One strategy is defined for each DSL, which means the effort to define traceability information is done once, and not in every mapping like the other approaches; this is a big advantage to the MTAF approach. A typically used strategy for a DSL is the Fuse strategy as the two merged models, the newly created output model and the target model, do not share a common ancestor.

Model Transformation Authoring Framework
Imperative Transformation API 29

Figure 2:
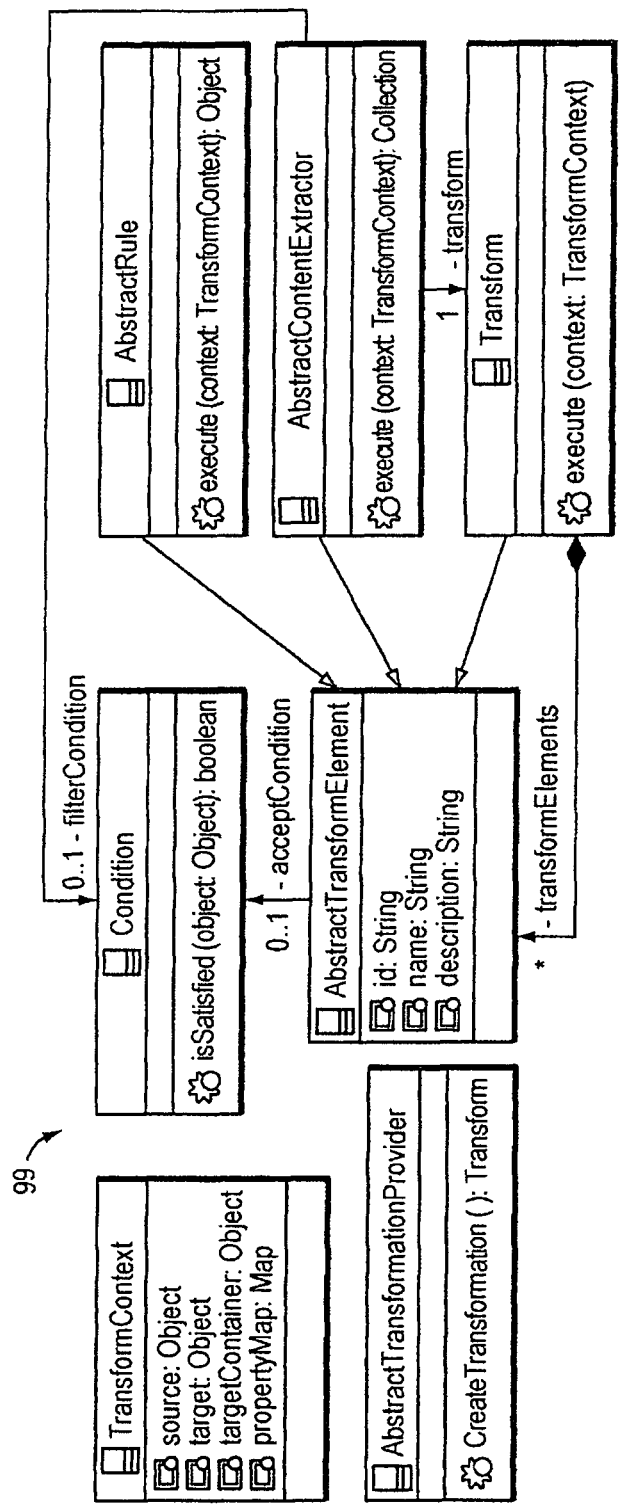
FIG. 2 is a simplified illustration of existing transformation service APIs.

The imperative transformation API 29 provided by MTAF is a realization of the abstract one 99 provided by RSxTS, shown in FIG. 2. More specifically, MTAF defines a collection of concrete rules, extractors and transforms that help in implementing a model-to-model transformation of the present invention 100, as shown to the right hand side of FIG. 3.

Transforms. The following extend Transform from RSxTS:

RootTransformation 30. The top level or root transform is provided for using a transformation provider. This transformation is configured with two sets of transformation items. The first set has an InitializeRule 113, which is used to initialize the transformation's global variables (discussed later on), followed by a MainTransform 115, which is the entry point to the transformation traversal strategy, then finally a FinalizeRule 102 that performs post-traversal processing. After executing this set, a transformation would have its output models 119a ready for consumption by the second set, which has the post processing rules 103, 104, 105. That set can have one or more of the following: a MergeRule 104 that merges the output models 119a to some configured target models 21, a JETRule 103 that passes the output models 119a to a JET transform 111, and a ChainRule 105 that chains the output models 119a as input to another transformation 110.

MainTransform 115. This transform is the entry point to the transformation's traversal strategy. It owns all the transformation's MapTransforms 28, which implement the various mappings between the input and output types, and acts as a switch statement for them. In other words, it iterates over them and delegates to the first nested transform that accepts the transformation's source element as input.

MapTransform 28. This transform implements a mapping between a type from the input domain DSL 118 and a type from the output domain DSL 119, where the types are represented by their corresponding EClasses. The transform owns a CreateRule 26, which is used to create an instance of the output EClass, as a first rule to ensure that the output instance is available as target to subsequently owned transform elements. Those elements can include instances of MoveRule 20, CustomRule 16, SubmapExtractor 18 and CustomExtractor 36c that implement the transform's mapping rules 10, 12, 14, 32, 34 between its input and output types.

Extractors. The following extend AbstractContentExtractor from RSxTS:

SubmapExtractor 18. This extractor represents a mapping between an input EReference and an output EReference. It is implemented to extract the contents of the input EReference from the owning transform's source element. Those contents are then used as inputs to another MapTransform 28 delegated to by this extractor. If the output EReference represents containment, the delegate transform is invoked with the contents immediately to create corresponding output elements. On the other hand, if it represents non-containment, the invocation is postponed to the FinalizeRule 102, as the intent is to set references to output elements, which might not have been created yet, in the output EReference of the owning transform's target container. Furthermore, in addition to the 'accept' Condition 22c (corresponding to Accept Condition Refinement 32 of the input domain) and the 'filter' Condition 36a (corresponding to input domain filter Condition Refinement 34a), this extractor 18 can be configured with a 'choose' Condition 36b (corresponding to input domain Filter Condition Refinement 34b) when the output EReference is non-containment. This helps set only output references that satisfies the condition. In addition, the extractor 18 can also be configured with a CustomExtractor, 36c (corresponding to input domain Custom Extractor Refinement 34c) providing user-defined logic for contents extraction. In the preferred embodiment, the logic is encoded as Java or OCL code that returns a collection.

Rules. The following extend AbstractRule from RSxTS:

CreateRule 26. This rule creates an instance of an output EClass and inserts it in an output EReference in the owning transform's target container. It also stores the created instance as the owning transform's new target. An 'accept' Condition 22a is set on the rule to verify that a transformation's source element conforms to the input EClass (type conformance).

MoveRule 20. This rule represents a mapping between an input EAttribute and an output EAttribute. It is implemented to copy the contents of the input EAttribute of the transform's source element and sets it to the output EAttribute of the transform's target element. Generally, the types of both attributes have to be compatible (e.g. both are Boolean). An exception is when the output type is a String and the input is a type that can be serialized to a String. An 'accept' condition 22b is set on the rule for purposes of type conformance and corresponds to accept condition refinement 32 of the input domain.

CustomRule 16. This rule extends the MoveRule 20 and differs from it by allowing user-provided logic for setting data to the transform's target. Custom mapping 12 of the input domain corresponds to CustomeRule 16. The logic is encoded in Java in a preferred embodiment.

InitializeRule 113. This rule is used to initialize the transform global variables defined as properties in the transform context. Two variables are defined: a 'containment' map from input to output elements and a 'reference' list of deferred non-containment EReferences to be handled in FinalizeRule 102.

FinalizeRule 102. This rule is used to process the 'reference' list of deferred non-containment references, collected from SubmapExtractors 18 throughout the transformation. For every such deferred reference, the rule 102 looks up the output element that corresponds to each input element using the 'containment' map and then sets a reference to that element in the corresponding target container. Input elements that do not have corresponding output elements are reported. This situation can occur when those input elements have not been transformed, usually a developer's mistake that can be corrected by making sure that those elements get covered by containment reference mappings in the scope of the transformation.

MergeRule 104. This rule is one of the post processing options for a transformation. The rule 104 merges the transformation's resulting output models 119*a* into configured target models 21 using the prior mentioned compare and merge framework. The intent is to synchronize the target models 21 based on changes happening in the input models (as represented in the new output models 119*a*). The matching strategy to use in the merge is the Fuse strategy. The rule 104 detects deltas between the two sets of models, selects the deltas to apply, and then applies them to the target models 21.

JETRule 103. This rule is another post processing option for a transformation. It acts as a proxy to a model-to-text JET transform 111.

ChainRule 105. This rule 105 is another post processing option for a transformation. It acts as a proxy to another model-to-model transform 110, effectively creating a chain. Declarative Mapping DSL 27

Figure 3:
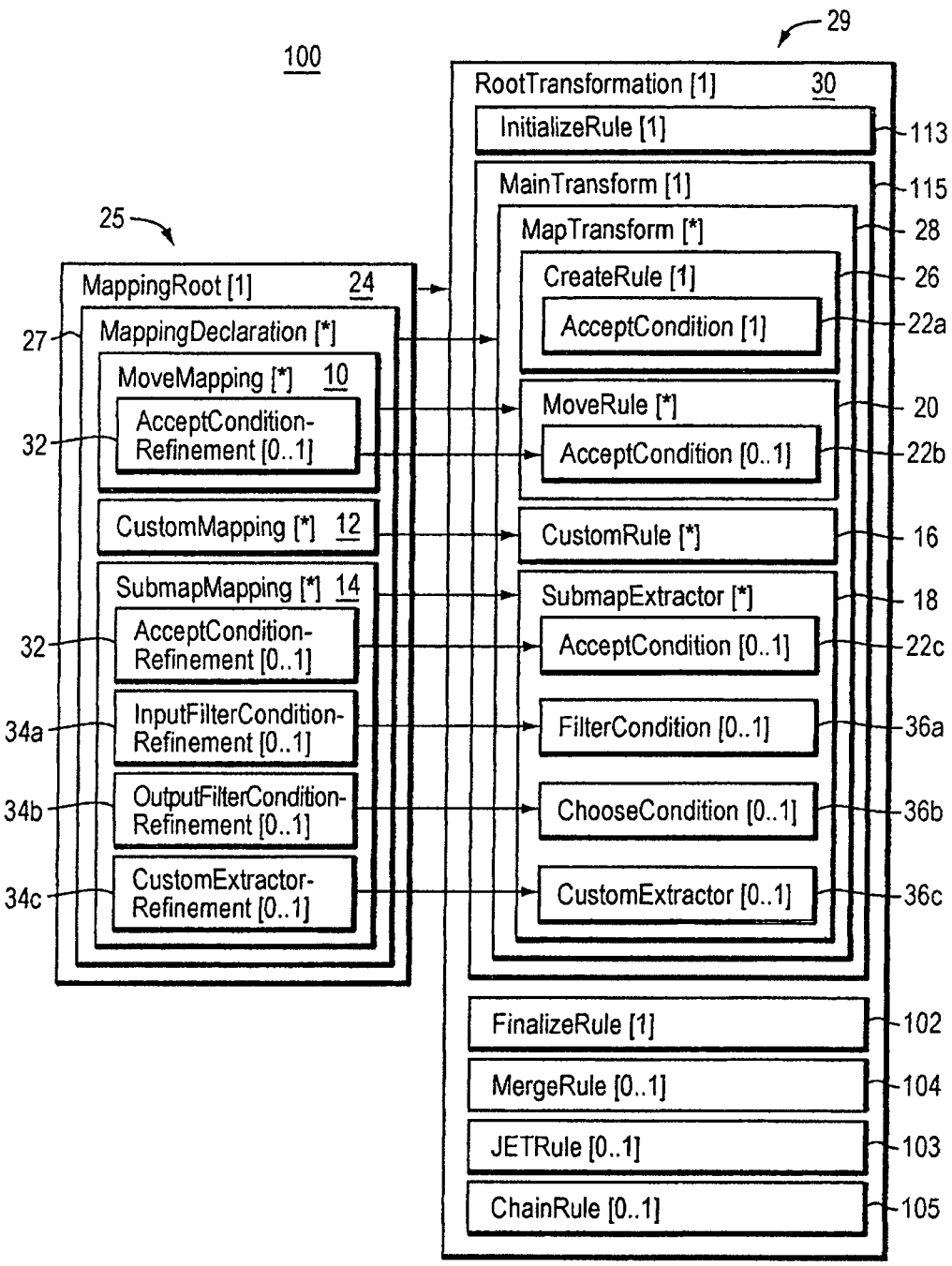
FIG. 3 is a schematic illustration of a declarative mapping from a domain specific language model (input domain meta model) to a transformation API (output domain meta model) in accordance with the present invention.
Figure 4:
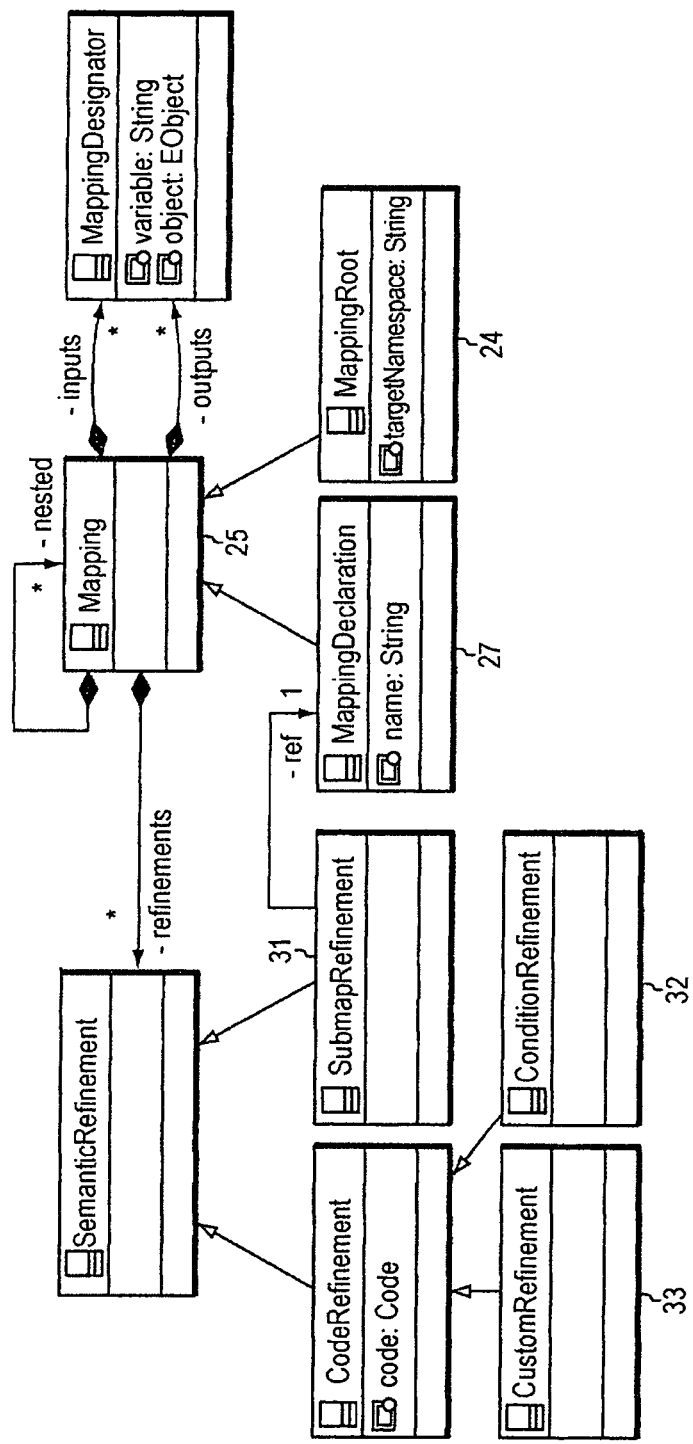
FIG. 4 is a schematic illustration of CMF mapping DSL of the present invention.

The present invention declarative mapping DSL 27 provided by MTAF is a refinement to the one provided by IBM Rational Software Architect Version 7.0 and is shown in FIG. 4. More specifically, MTAF defines the mapping domains to be Ecore-based and adds new semantic refinements that are needed to implement model-to-model transformations. MTAF also provides a mapping from this refined DSL 27 to the imperative transformation API 29 defined in the previous section discussing FIG. 3. The mapping of invention system 100 shown in FIG. 3, is specified as a JET template that is used to generate transformation implementation 29 from mapping models 25. Using JET with its JMerge strategy allows the generated code 29 to be augmented with more imperative transformation logic that cannot be expressed with the mapping model 25. In this subsection, the refined DSL 27 and how it corresponds to the transformation API 29 is presented.

MappingRoot 24. The top most level of nesting in a mapping model 25 is the MappingRoot 24. The MappingRoot 24 contains a collection of MappingDeclarations 27. MTAF defines the input and output domains of a MappingRoot 24 to be the root EPackages of the mapped DSLs 118,119. Upon code generation, a MappingRoot 24 is mapped to a RootTransformation 30 that owns an InitializeRule 113, a FinalizeRule 102 and optionally one or more of MergeRule 104, JETRule 103 and ChainRule 105 as previously discussed.

MappingDeclaration 27. The second level of nesting in a mapping model 25 is the MappingDeclaration 27. MappingDeclaration 27 contains a collection of inner mappings. MTAF allows one input and one output domains for a MappingDeclaration 27 and defines them to be EClasses from the mapped EPackages. Upon code generation, a MappingDeclaration 27 is mapped to a MapTransform 28 that owns a CreateRule 26, which in turn owns an 'accept' Condition 22*a*.

MoveMapping 10. There is a MoveMapping 10, that is created within MappingDeclaration 27. MTAF allows one input and one output domains for a MoveMapping 10 and defines them to be compatible (same or assignable) EAttributes from the mapped EClasses. In addition, a MoveMapping 10 is allowed to have an 'accept' ConditionRefinement 32, specified as a boolean expression in Java or OCL in one embodiment. The context of the expression is an instance of the owning declaration's input type. Upon code generation, a MoveMapping 10 is mapped to a MoveRule 20. If it has an 'accept' ConditionRefinement 32, then an 'accept' Condition 22*b* is added to the MoveRule 20.

CustomMapping 12. Another mapping that is created within MappingDeclaration 27 is CustomMapping 12. MTAF allows any number of input and output domains for a CustomMapping 12 and defines them to be EStructuralFeature from the mapped EClasses, or the EClasses themselves. A CustomMapping 12 has a CustomRefinement 33, specified with an imperative expression in Java in one embodiment. The context of the expression is both an instance of the owning declaration's input type and an instance of its output type. Upon code generation, a CustomMapping 12 is mapped to a CustomRule 16.

SubmapMapping 14. Another mapping that is created within MappingDeclaration 27 is SubmapMapping 14. MTAF allows one input and one output domains for a SubmapMapping 14 and defines them to be EReferences from the mapped EClasses. In addition, a SubmapMapping 14 has a SubmapRefinement 31 with a reference to another MappingDeclaration 27 (can recursively reference its owning MappingDeclaration). The mapping's input type must be 'coercible' (same, sub or super type) to the input type of the referenced declaration. Also, the referenced declaration's output type must be 'assignable' (same or sub type) to the output type of the mapping. In addition, a SubmapMapping 14 can have an optional 'accept' ConditionRefinement 32 to determine whether the mapping is allowed to run. Three additional optional refinements are introduced by MTAF: an 'inputFilter' ConditionRefinement 34*a* to be checked on every element in the input EReferences to determine whether it gets processed, an 'outputFilter' ConditionRefinement 34*b* to be checked on every candidate referenced output element to determine whether it gets set in the output EReferences, and an 'extractor' CustomRefinement 34*c* to change the collection of candidate input elements to be processed. The semantics of these requirements are given in the following Table 1:

TABLE 1

SubmapMapping refinements semantics

| Refinement | Language | Expression Type | Context Variable: Type |
|---|---|---|---|
| Accept Condition | Java, OCL | boolean | <Type>_src: Input Type |
| Input Filter | Java, OCL | boolean | <feature>_src: Input Feature's Type |
| Output Filter | Java, OCL | boolean | <feature>_tgt: Output Feature's Type |
| Custom Extractor | Java | collection | <Type>_src: Input Type |

Upon code generation, a SubmapMapping 14 is mapped to a SubmapExtractor 18. If it has an 'accept' ConditionRefinement 32, then an 'accept' Condition 22*c* is added to the SubmapMapping 14. If it has an 'inputFilter' ConditionRefinement 34*a*, then a 'filter' Condition 36*a* is added to the SubmapMapping 14. If it has an 'outputFilter' ConditionRefinement 34*b*, then a 'choose' Condition 36*b* is added to the SubmapMapping 14. Finally, if it has an 'extractor' CustomRefinement 34*c*, then a CustomExtractor 36*c* is added to the SubmapMapping 14.

Illustrated Example

Figure 5:
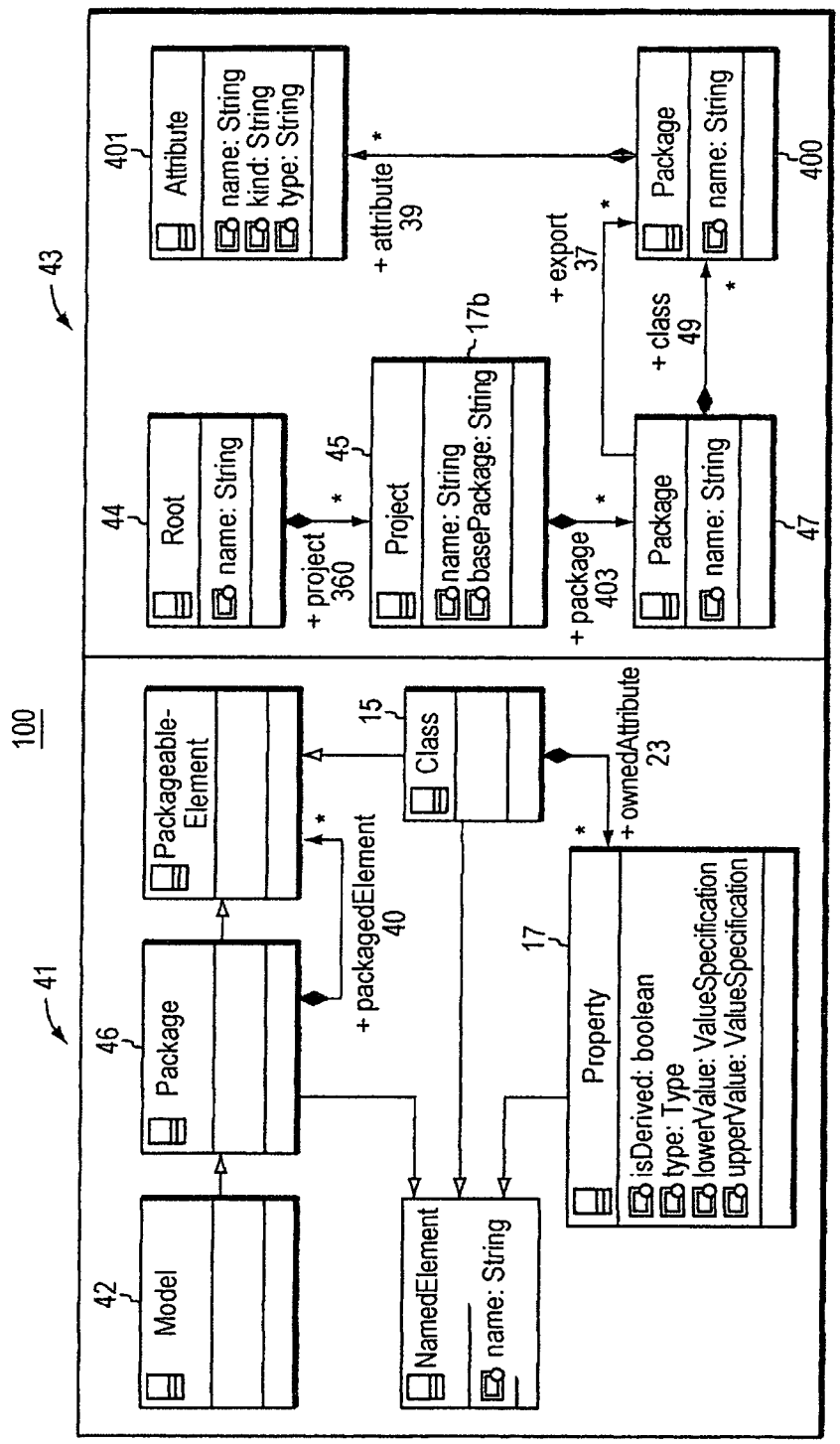
FIG. 5 is a schematic view of an input domain meta model and output domain meta model in an example of the present invention.

The following non-limiting example of the present invention method and system 100 demonstrates a transformation between a high level DSL (UML2), used to capture a design, and a low level DSL (GenModel) used for java code generation, as shown in FIG. 5. This example illustrates the present invention 100 using the tooling provided by MTAF to automate a model to model transformation authoring process.

Defining the Mapping Model

Figure 6:
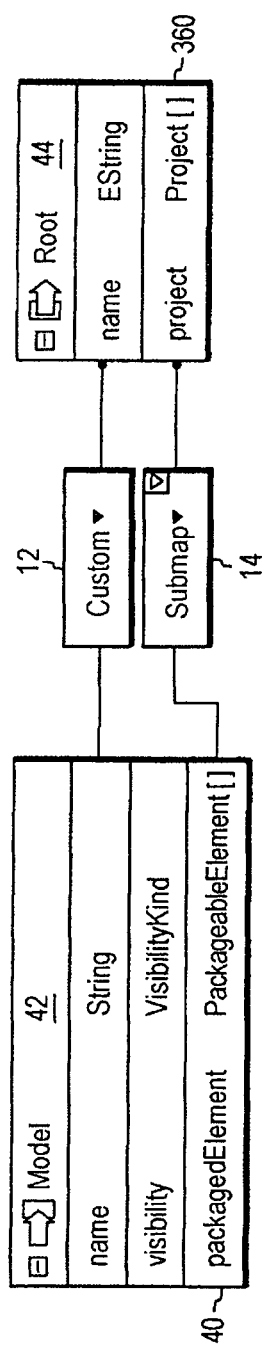
FIG. 6 is a block diagram of a ModelToRoot Mapping Declaration in an embodiment of the present invention.

The first step in the authoring process of the transformation is to specify a mapping between the two DSLs (input and output domain) 41, 43. MTAF provides an Eclipse-based mapping editor that is an extension of the one provided in IBM Rational Software Architect Version 7.0. The editor allows for choosing the input and output DSLs 41, 43 as domains of a MappingRoot 24. Then, it allows for graphically specifying MappingDeclarations 27 between those DSLs. In the case study, the input domain DSL 41 is UML2, while the output domain DSL 43 is GenModel. Five declarations 27 are identified:

ModelToRoot. This mapping, shown in FIG. 6, is from Model EClass 42 of UML2 to Root EClass 44 of GenModel. The input's name is mapped to the output's name using a CustomMapping 12 with the custom Java code: 'Root_tgt-.setName(Model_src.getName( )+"Workspace");'. Also, the input's packagedElement 40 is mapped to the output's project 360 using a SubmapMapping 14 with reference to the 'PackageToProject' declaration.

Figure 7:
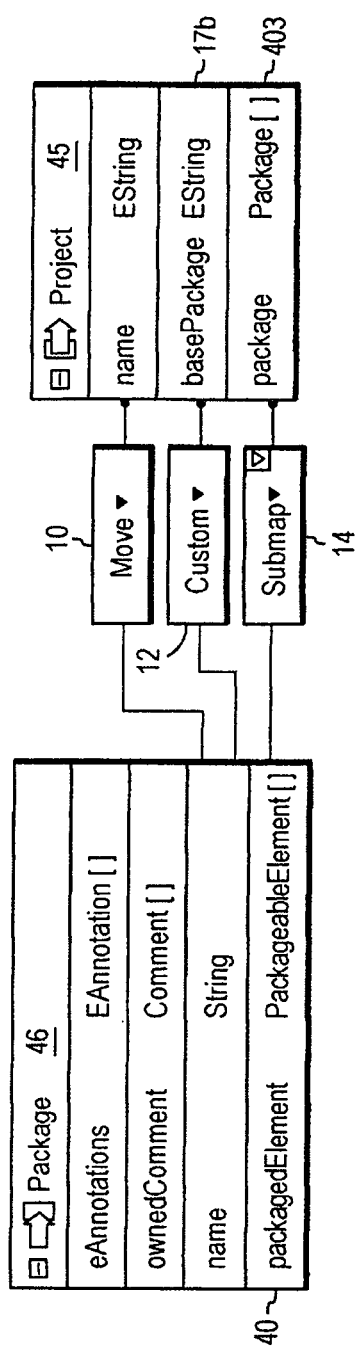
FIG. 7 is a block diagram of a PackageToProject Mapping Declaration in an embodiment of the present invention.

PackageToProject. This mapping, shown in FIG. 7, is from Package EClass 46 of UML2 to Project EClass 45 of GenModel. The input's name is mapped to the output's name using a MoveMapping 10. The input's name is mapped to the output's basePackage 17b using a CustomMapping 12 with the custom Java code: 'Project_tgt.setBasePackage("com."+Package_src.getName( ));'. Finally, the input's packagedElement 40 is mapped to the output's package 403 using a SubmapMapping 14 with reference to the 'PackageToPackage' declaration.

Figure 8:
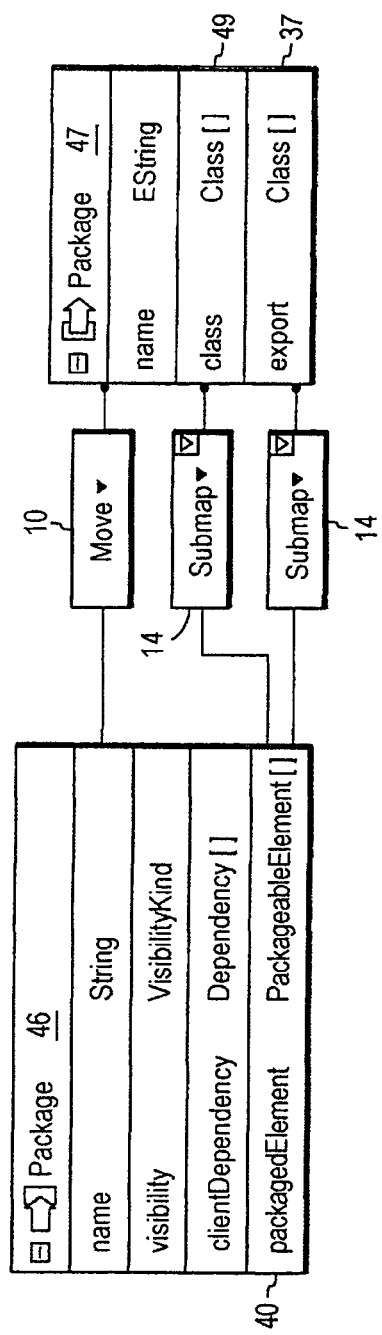
FIG. 8 is a block diagram of a PackageToPackage Mapping Declaration in an embodiment of the present invention.

PackageToPackage. This mapping, shown in FIG. 8, is from Package EClass 46 of UML2 to Package EClass 47 of GenModel. The input's name is mapped to the output's name using a MoveMapping 10. The input's packagedElement 40 is mapped to the output's class 49 using a SubmapMapping 14 with reference to the 'ClassToClass' declaration. Also, the input's packagedElement 40 is mapped to the output's export 37 using a SubmapMapping 14 with reference to the 'ClassToClass' declaration. However, this last mapping has the following refinements 32,34 a,b: an 'accept' Condition 22c with the OCL expression 'Package_src.visibility=Visibility.Public', an 'inputFilter' 36a with the OCL expression 'packagedElement_src.visibility=Visibility.Public', and an 'outputFilter' 36b with the Java code 'return !export_tgt.get Attribue( ).is Empty( );'.

Figure 9:
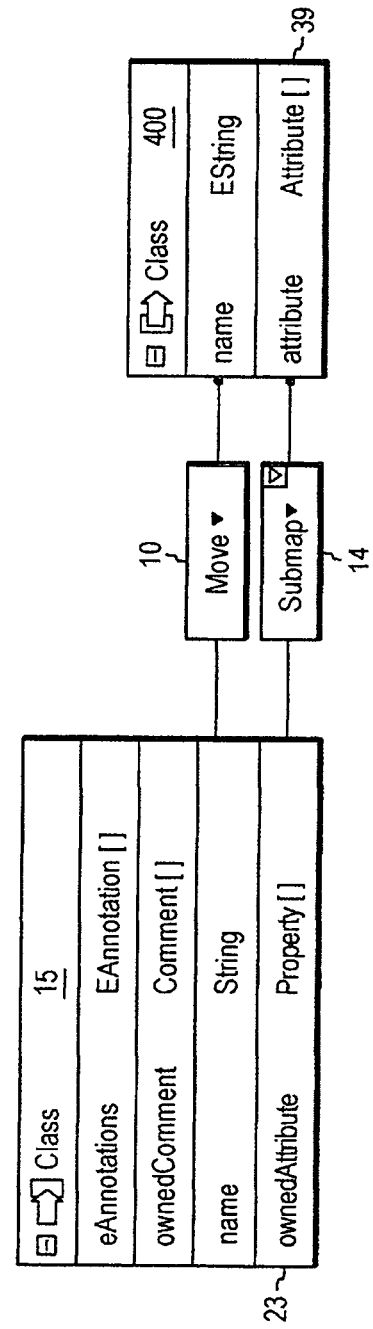
FIG. 9 is a block diagram of a ClassToClass Mapping Declaration in an embodiment of the present invention.

ClassToClass. This mapping, shown in FIG. 9, is from Class EClass 15 of UML2, to Class EClass 400 of GenModel. The input's name is mapped to the output's name using a MoveMapping 10. The input's ownedAttribute 23 is mapped to the output's attribute 39 using a SubmapMapping 14 with reference to the 'PropertyToAttribute' declaration. The last mapping has a custom 'extractor' 36c with Java code 'return Utils.getAllAttributes(Class_src);'.

Figure 10:
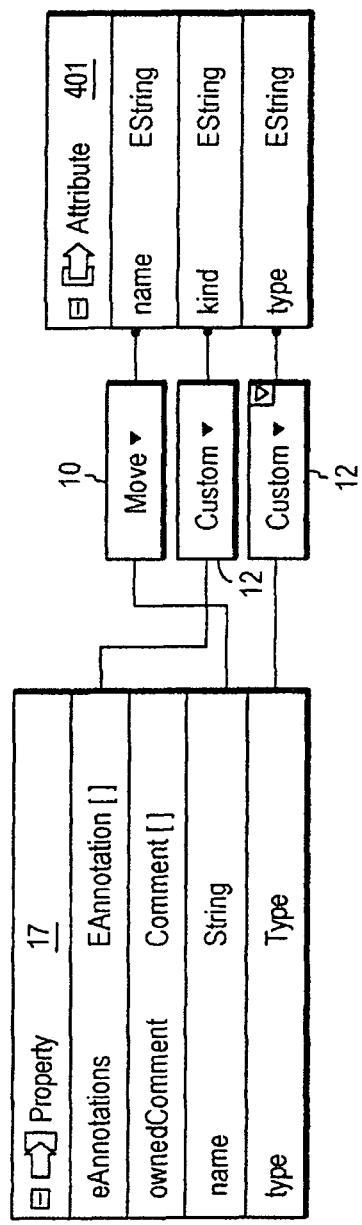
FIG. 10 is a block diagram of a PropertyToAttribute Mapping Declaration in an embodiment of the present invention.

PropertyToAttribute. This mapping, shown in FIG. 10, is from Property EClass 17 of UML2 to Attribute EClass 401 of GenModel. The input's name is mapped to the output's name using a MoveMapping 10. The input EClass is mapped to the output's kind using a CustomMapping 12 with the custom Java code: 'Attribute_tgt.setKind (Property_src.get Upper( )>1||Property_src.getUpp er( )==−1)?"LIST":"FIELD");'. The input type is mapped to the output's type using a CustomMapping 12 with the custom Java code: 'Attribute_tgt. setType (Property_src.getType( ).get Name( ));'.

Generating the Transformation Implementation

The automation provided in MTAF enables incremental adding of mapping declarations and generating implementations for them. In one embodiment, the implementations are in the form of Java source code that uses the MTAF provided transformation API 29. Every mapping declaration corresponds to a Java class named after the declaration. For the example, a subset of the generated transformation is shown in FIG. 11 (left side). An extract of the generated code 29 for the 'PropertyToAttributeTransform' is shown in FIG. 11 (right hand side).

Customizing the Generated Transformation

One of the distinguishing features of the MTAF authoring tool 100 of the present invention is the ease with which the generated transformations can be further customized and extended. Regions of the generated source are marked with @generated tags. When these tags are present the code generator recognizes that it emitted the source for that region previously and so can freely discard it and emit new code as dictated by changes to the mapping model 25. When the tags are removed or a 'NOT' is added to them, the code generator preserves the section of code under control. An example of such customizing transformation code is:

```
/** @generated NOT */
protected void addGeneratedTransformElements(Registry registry) {
    add(getNameToName__Rule( ));
    add(getToKind__Rule( ));
    add(getTypeToType__Rule( ));
    add(new DecorateAttributeRule( ));// added rule
}
```

Deploying the Generated Transformation

The invention MTAF tooling provides the infrastructure required to deploy the new generated transformation as a plug-in in the Eclipse-based RSx family of modeling tools. In addition to the generated transformation implementation, MTAF also generates code to register the new transformation with the RSx Transformation Service. At runtime, the transformation 120 can be configured with various options including the input models 118a and the post processing actions as discussed above.

Figure 12:
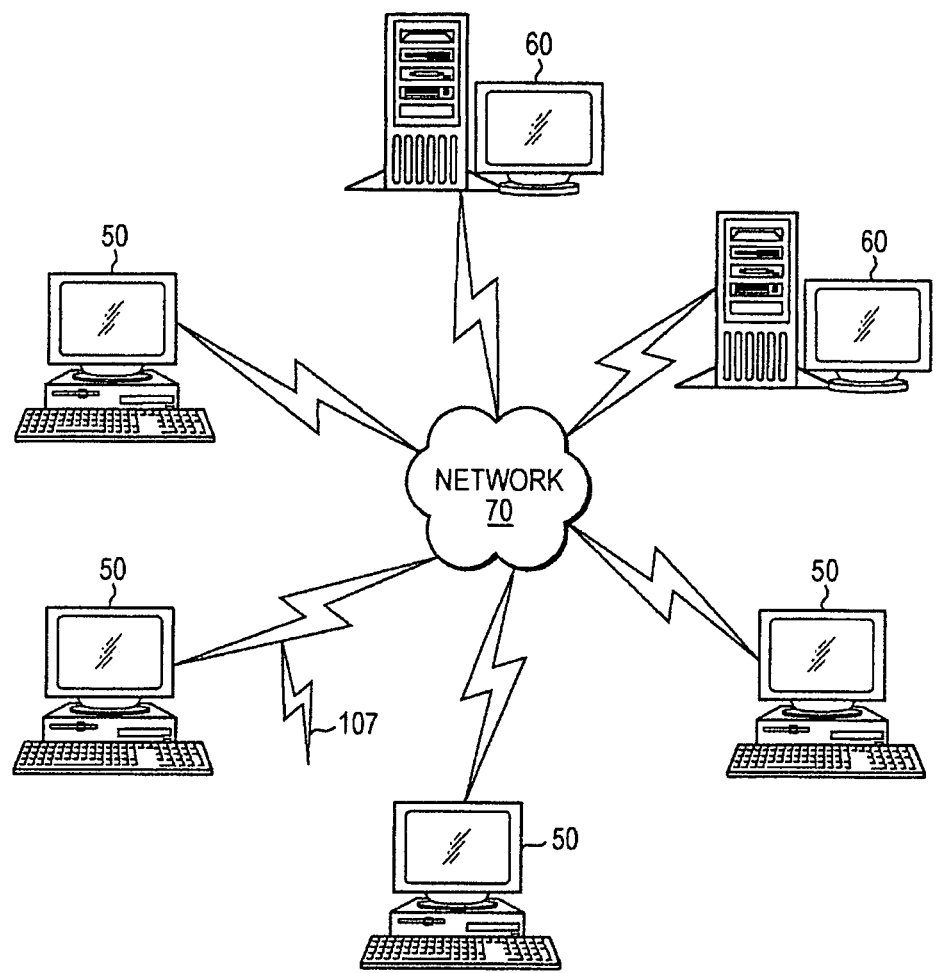
FIG. 12 is a schematic view of a computer network environment in which embodiments of the present invention are implemented.

FIG. 12 illustrates a computer network or similar digital processing environment in which the present invention may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 13:
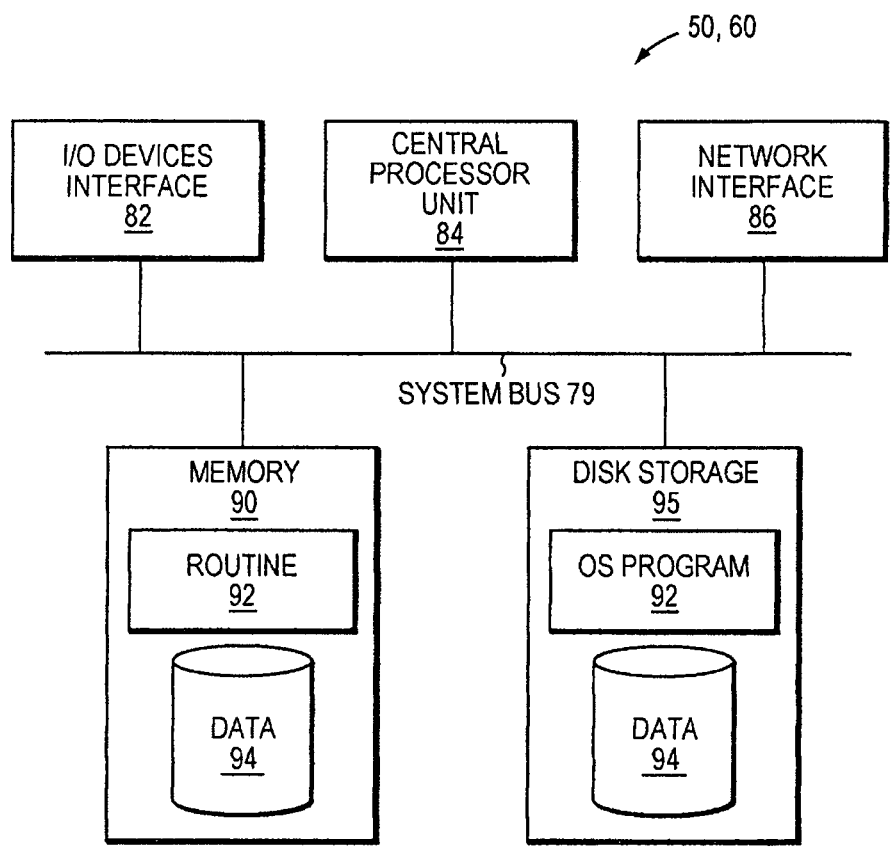
FIG. 13 is a block diagram of a computer node in the network of FIG. 12.

FIG. 13 is a diagram of the internal structure of a computer (e.g., client processor 50 or server computers 60) in the computer system of FIG. 12. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 12). Memory 90 provides volatile storage for computer software instructions 92 and data 94 used to implement an embodiment of the present invention (e.g., transformation system 100, transformation authoring method/process and transformation code implementation/runtime features detailed above in FIGS. 1 through 11). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 12 and 13 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

What is claimed is:

1. A computer method for generating software development model-to-model transformations from one software program domain having a respective structured hierarchy to a second software program domain, comprising:

generating software development model-to-model transformations from a given domain of a software program to a target domain of the software program, at least the given domain having a respective structured hierarchy, by:

enabling a user to model and specify a transformation declarative provided by a Model Transformation Authoring Framework (MTAF);

in response to the user specified transformation declarative, creating a declarative mapping between a domain specific language modeling software development design of the software program in the given domain and a modeling language modeling software development design of the software program in the target domain, the declarative mapping specifying how the domain specific language of the given domain relates to the modeling language of the target domain;

using the declarative mapping, generating a transformation code implementation of transformation from a software development model of the software program in the given domain to a software development model of the software program in the target domain, the generated transformation code being executable to perform a transformation of the domain specific language of the given domain to the modeling language of the target domain, said generating the transformation code implementation including augmenting the transformation code with more transformation logic that is unexpressible in the declarative mapping, wherein the MTAF provides to the user design decisions with respect to specification of the declarative mapping; and outputting instances of models of the software program in the target domain resulting from the performed transformation at runtime.

2. A method as claimed in claim 1 wherein the domain specific modeling language modeling the given domain is UML or a MOF-based DSL (Meta Object Facility-based domain specific language); and the modeling language of the target domain is another MOF-based DSL.

3. A method as claimed in claim 1 wherein the MTAF provides to the user design decisions with respect to transformation rules in the declarative mapping.

4. A method as claimed in claim 1 wherein the MTAF provides to the user design decisions with respect to Rule organization in the declarative mapping.

5. A method as claimed in claim 1 wherein the MTAF provides to the user design decisions with respect to Rule application control in the declarative mapping.

6. A method as claimed in claim 1 wherein the MTAF provides to the user design decisions with respect to Source-Target relationship in the declarative mapping.

7. A method as claimed in claim 1 wherein the MTAF provides to the user design decisions with respect to incrementality in the declarative mapping.

8. A method as claimed in claim 1 wherein the MTAF provides to the user design decisions with respect to Directionality and tracing in the declarative mapping.

9. A method as claimed in claim 1 wherein generating a transformation code implementation employs a framework API provided by Model Transformation Authoring Framework (MTAF).

10. A method as claimed in claim 9 wherein the MTAF utilizes JET templates (Java emitter templates) and enables any one or combination of: transformation code regeneration, modification of the transformation code and debugging of the transformation code.

11. A method as claimed in claim 9 wherein executing the generated transformation code includes configuring the transformation at runtime.

12. A method as claimed in claim 11 wherein the transformation includes any one or combination of merging output models, chaining output models, instantiating text templates using the output models, persisting output models and other post processing actions on the output models.

13. Computer apparatus for providing software development, model-to-model transformations from one software program domain having a respective structured hierarchy to a second software program domain, comprising:

given a domain of a software program in software development and a target software program domain in software development, at least the given domain having a respective structured hierarchy, and the software development having model-to-model transformation from the given software program domain to the target software program domain;

a declarative mapper, provided by a Model Transformation Authoring Framework (MTAF), executing on a processor and mapping between a domain specific language modeling software development design of the software program in the given domain and a modeling language modeling software development design of the software program in the target domain, the declarative mapper enabling a user to specify how the domain specific language modeling in the given domain relates to the modeling language of the target domain;

a code generator executable on the processor and responsive to the declarative mapper, the code generator generating a transformation code implementation of transformation from a software development model of the software program in the given domain to a software development model of the software program in the target domain, the generated transformation code being executable to perform a transformation of the domain specific language of the given domain to the modeling language of the target domain, and the code generator able to augment the transformation code with more transformation logic that is unable to be expressed with the declarative mapper, wherein the MTAF provides to the user design decisions with respect to specification of the declarative mapping; and an output member outputting to a computer display instances of models of the software program in the target domain resulting from the performed transformation at runtime.

14. Computer apparatus as claimed in claim 13 wherein the domain specific modeling language modeling the given domain is UML or a MOF-based DSL (Meta Object Facility-based domain specific language), and wherein the modeling language of the target domain is another MOF-based DSL.

15. Computer apparatus as claimed in claim 13 wherein the MTAF utilizes JET templates (Java emitter templates) and enables any one or combination of : transformation code regeneration, modification of the transformation code and debugging of the transformation code.

16. Computer apparatus as claimed in claim 13 further comprising a transformation configurer configuring the transformation before execution of the generated transformation code at runtime, such that the transformation includes any one or combination of: merging output models, chaining output models, instantiating text templates using the output models, persisting output models and other post processing actions on the output models.

17. A computer system for providing software development model-to-model transformations from one software program domain to another software program domain, comprising:

given a domain of a software program in software development and a target domain of the software program in software development, at least the given domain having a respective structured hierarchy and the software development having model-to-model transformations from the given software program domain to the target software program domain, mapping means, provided by a Model Transformation Authoring Framework (MTAF), for enabling a user to specify a declarative mapping between a domain specific language modeling software development design of the software program in the given domain and a modeling language modeling software development design of the software program in the target domain, the declarative mapping specifying how the domain specific language modeling in the given domain relates to the modeling language of the target domain;

code generator means responsive to the mapping means and generating a transformation code implementation of transformation from a software development model of the software program in the given domain to a software development model of the software program in the target domain, the generated transformation code being executable to perform a transformation of the domain specific language of the given domain to the modeling language of the target domain, the code generator means able to augment the transformation code with more transformation logic that is unable to be expressed with the mapping means, wherein the MTAF provides to the user design decisions with respect to specification of the declarative mapping;

transformation configuration means for optionally configuring the transformation before execution of the generated transformation code at runtime such that the transformation includes any one or combination of merging output models, chaining output models, instantiating text templates using the output models, persisting models and other post processing actions on the output models; and output means for outputting instances of models of the software program in the target domain resulting from the performed transformation at runtime.

18. A computer program product comprising:

a non-transient computer readable storage medium having a computer readable program, wherein the computer readable program when executed on a computer causes:

generating software development model-to-model transformations between a given domain of a software program and a target domain, at least the given domain having a respective structured hierarchy, said generating software development model-to-model transformations being by:

enabling a user to specify a transformation declarative mapping provided by a Model Transformation Authoring Framework (MTAF) between a domain specific language modeling software development design of the software program in the given domain and a modeling language modeling software development design of the software program in the target domain, the transformation declarative mapping specifying how the domain specific language modeling in the given domain relates to the modeling language of the target domain;

generating a transformation code implementation of transformation from a software development model of the software program in the given domain to a software development model of the software program in the target domain, the generated transformation code being executable to perform a transformation of the domain specific language of the given domain to the modeling language of the target domain, said generating the transformation code implementation including augmenting the transformation code with more transformation logic that is unexpressible in the declarative mapping, wherein the MTAF provides to the user design decisions with respect to specification of the declarative mapping; and outputting instances of models of the software program in the target domain resulting from the performed transformation at runtime.

\* \* \* \* \*